(12) United States Patent
Alexander et al.

(10) Patent No.: US 10,540,388 B1
(45) Date of Patent: Jan. 21, 2020

(54) LOCATION-AWARE INTELLIGENT DATA MIGRATION AND DELIVERY

(71) Applicant: International Business Machines Corporation, Armonk, NY (US)

(72) Inventors: Michael E. Alexander, Great Falls, VA (US); Kimberly G. Starks, Nashville, TN (US); Gandhi Sivakumar, Bentleigh (AU); Kushal Patel, Pune (IN); Sarvesh Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/179,191

(22) Filed: Nov. 2, 2018

(51) Int. Cl.
*G06F 16/487* (2019.01)
*H04L 29/08* (2006.01)
*H04W 4/021* (2018.01)
*G06F 16/9537* (2019.01)

(52) U.S. Cl.
CPC ........ *G06F 16/487* (2019.01); *G06F 16/9537* (2019.01); *H04L 67/18* (2013.01); *H04L 67/306* (2013.01); *H04W 4/021* (2013.01)

(58) Field of Classification Search
CPC ... G06F 16/487; G06F 16/9537; H04L 67/18; H04L 67/306; H04W 4/02
USPC ........................................................ 455/456
See application file for complete search history.

(56) References Cited

U.S. PATENT DOCUMENTS

| 6,125,278 | A | 9/2000 | Wieczorek et al. |
| 2002/0019809 | A1 | 2/2002 | Kitchen et al. |
| 2002/0198991 | A1* | 12/2002 | Gopalakrishnan ...... H04L 29/06 709/225 |
| 2008/0204225 | A1 | 8/2008 | Kitchen |
| 2013/0204699 | A1* | 8/2013 | MacNeille .............. H04W 4/04 705/14.53 |
| 2017/0019446 | A1 | 1/2017 | Son et al. |

(Continued)

FOREIGN PATENT DOCUMENTS

| WO | 2016109131 A1 | 7/2016 |
| WO | 2017177183 A1 | 10/2017 |

OTHER PUBLICATIONS

Popeanga et al., "Real-Time Business Intelligence for the Utilities Industry," Database Systems Journal, vol. III, No. 4, 2012, pp. 15-24.

(Continued)

*Primary Examiner* — Charles N Appiah
*Assistant Examiner* — Nicole M Louis-Fils
(74) *Attorney, Agent, or Firm* — Yee & Associates, P.C.

(57) ABSTRACT

Migrating and delivering data content to a traveling user is provided. A pattern of data access corresponding to a user is determined. The pattern of data access includes previous data access requests made by the user and data to-be delivered to the user. A travel plan corresponding to the user is determined. The travel plan includes a set of intermediate data delivery destinations based on travel mode, travel route, travel schedule, and geographic locations of stops corresponding to the set of intermediate data delivery destinations. The data content is migrated to a set of data storage locations as the user travels based on the pattern of data access, the travel plan, and the set of intermediate data delivery destinations along the travel route. The data content is delivered to the user at geographic locations corresponding to the set of data storage locations as the user travels.

18 Claims, 7 Drawing Sheets

(56) References Cited

U.S. PATENT DOCUMENTS

2017/0331921 A1 11/2017 Moreira da Mota et al.
2018/0234874 A1* 8/2018 Beattie .................... H04W 4/02

OTHER PUBLICATIONS

Thembelihle et al., "Softwarization of Mobile Network Functions Towards Agile and Energy Efficient 5G Architectures: A Survey," Wireless Communications & Mobile Computing, vol. 2017, Nov. 20, 2017, 21 pp.
Aissioui et al., "Toward Elastic Distributed SDN/NFV Controller for 5G Mobile Cloud Management Systems," IEEE Access, vol. 3, Nov. 9, 2015, pp. 2055-2064.
"Content Delivery Network," Wikipedia, Accessed on Oct. 5, 2018, 8 pp. https://en.wikipedia.org/wiki/Content_delivery_network.
"Watson Speech to Text," Accessed on Oct. 19, 2018, 6 pp. https://www.ibm.com/cloud/watson-speech-to-text.

* cited by examiner

LOCATION-AWARE INTELLIGENT DATA MIGRATION AND DELIVERY

BACKGROUND

1. Field

The disclosure relates generally to wireless communication networks and more specifically to managing and facilitating access to data content in a distributed wireless communication network by a user while traveling using an artificial intelligence-based data migration and delivery apparatus in a service orchestration layer of a fifth-generation network.

2. Description of the Related Art

Fifth-generation (5G) cellular mobile communications succeed fourth-generation (4G), third-generation (3G), and second-generation (2G) systems. 5G performance includes higher data rates to move more data, reduced latency to be more responsive, increased energy savings, cost reductions, higher system capacity, and greater device connectivity to service more devices at the same time. 5G may provide network speeds of up to 20 gigabits per second.

Software-defined networking (SDN) and network functions virtualization (NFV) play a role in 5G to scale networks quickly. SDN carves virtual "sub-networks" or slices that can be then used for bigger bandwidth applications. This includes video, which may need throughput speeds of 10 gigabits per second, as well as lower bandwidth applications to connect devices that are less demanding on the network, such as smart watches.

5G networks use a system of cell sites that divide their territory into sectors and send encoded data via radio waves. Each cell site is connected to a network backbone via wired or wireless connections. 5G may also transmit over unlicensed frequencies currently used for Wireless-Fidelity (Wi-Fi), without conflicting with existing Wi-Fi networks.

Thus, 5G networks are more likely to be networks of small cells, even down to the size of home routers rather than huge towers radiating great distances. This small cell size is partly due to the frequencies used, but also is used to expand network capacity. For example, the more cells that exist in a network, the more data that can enter the network. As a result, 5G networks need to be smarter than previous systems because 5G networks manage an increased number of smaller cells that can change in size and shape.

SUMMARY

According to one illustrative embodiment, a computer-implemented method for migrating and delivering data content to a traveling user is provided. A computer determines a pattern of data access corresponding to a user. The pattern of data access includes previous data access requests made by the user and data to-be delivered to the user. The computer determines a travel plan corresponding to the user. The travel plan includes a set of one or more intermediate data delivery destinations based on travel mode, travel route, travel schedule, and geographic locations of stops corresponding to the set of intermediate data delivery destinations along the travel route. The computer migrates the data content to a set of one or more data storage locations as the user travels based on the pattern of data access, the travel plan, and the set of intermediate data delivery destinations along the travel route. The computer delivers the data content to the user at geographic locations corresponding to the set of one or more data storage locations as the user travels. According to other illustrative embodiments, a computer system and computer program product for migrating and delivering data content to a traveling user are provided.

DETAILED DESCRIPTION

Figure 1:
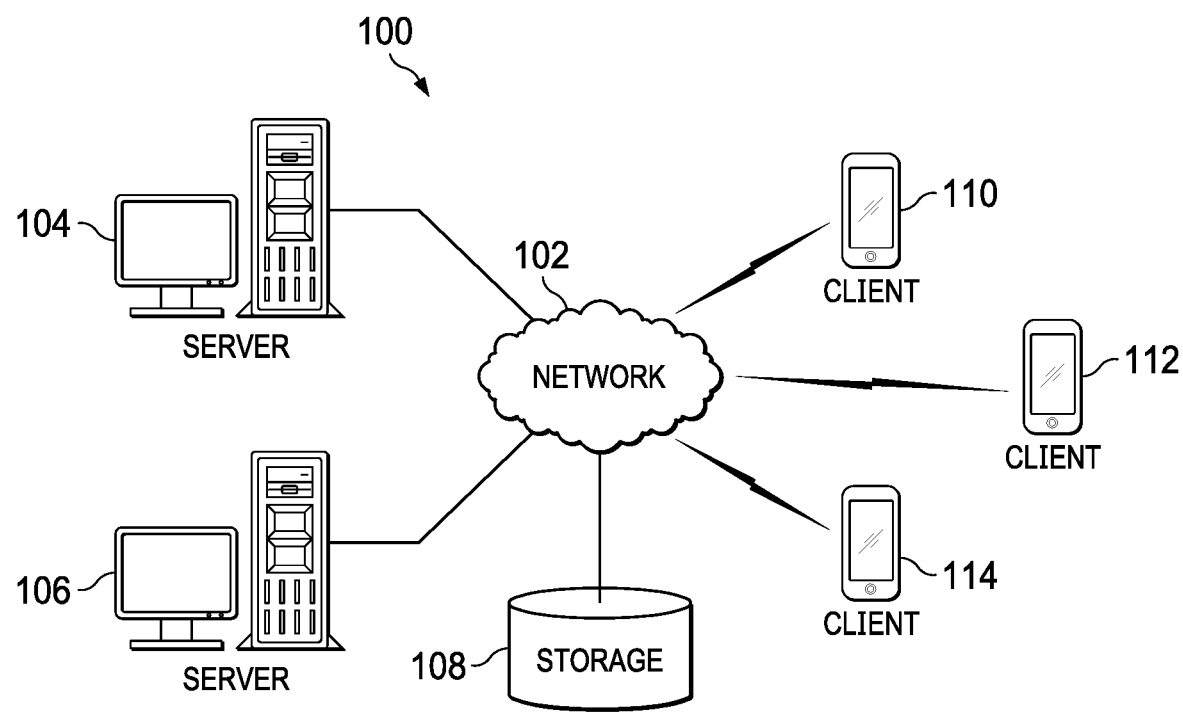
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
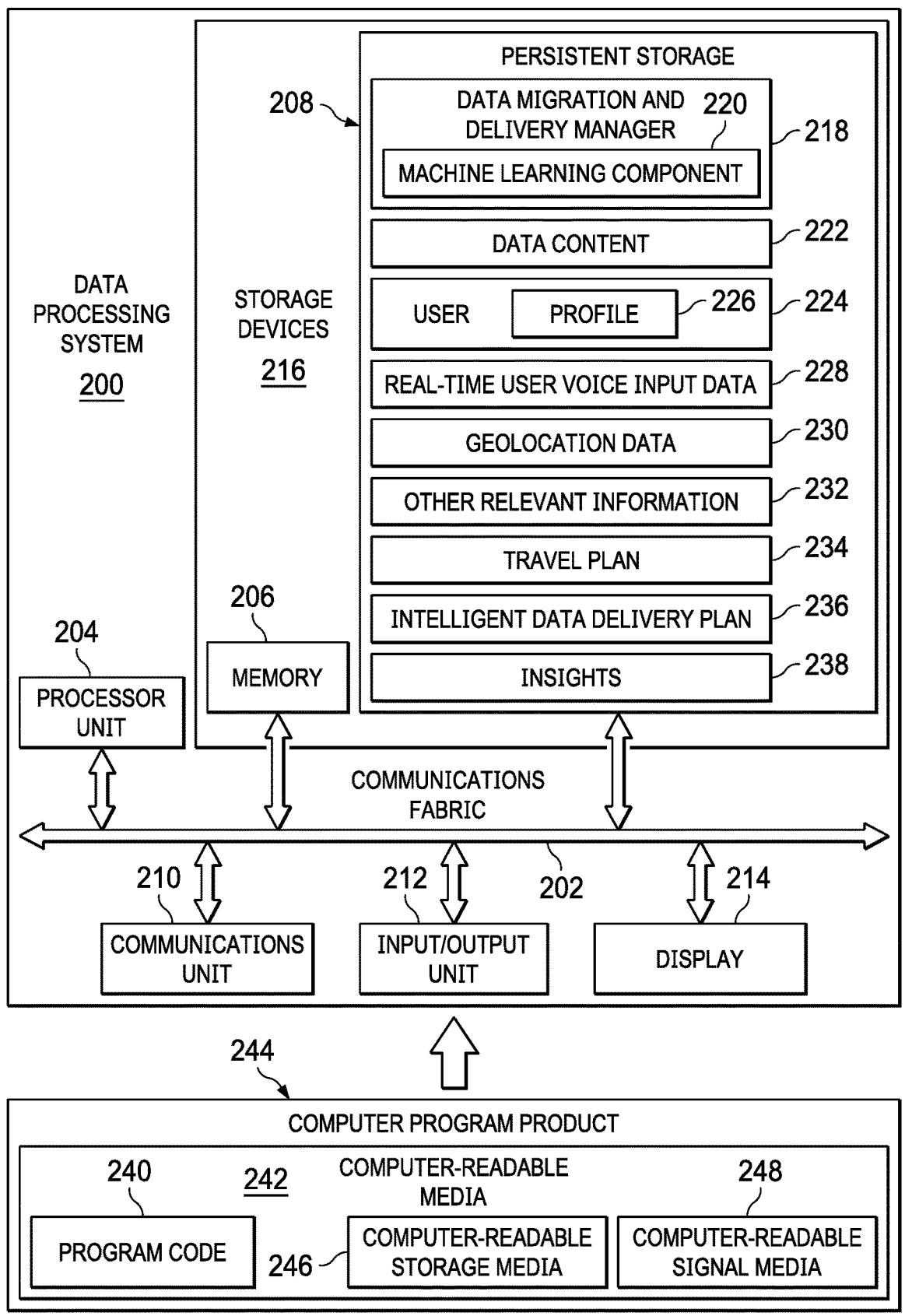
FIG. 2 is a diagram of a data processing system in which illustrative embodiments may be implemented.
Figure 3:
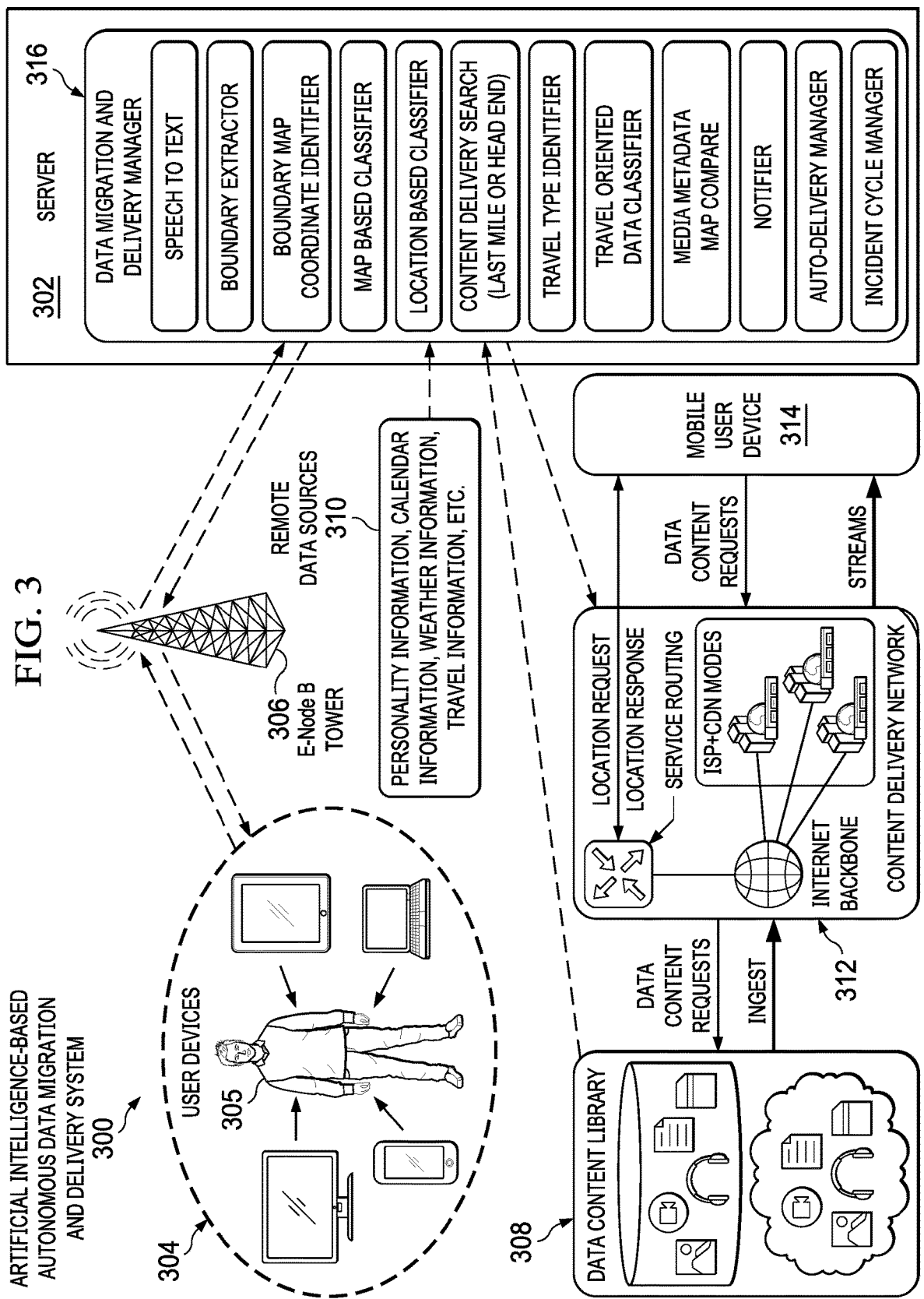
FIG. 3 is a diagram illustrating an example of an artificial intelligence-based autonomous data migration and delivery system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile data processing systems, and other devices in which the illustrative embodiments may be implemented. Network data processing system 100 contains network 102, which is the medium used to provide communications links between the computers, mobile data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 provide a set of services that manage and facilitate access to data content by client device users while traveling. Also, it should be noted that server 104 and server 106 may each represent clusters of servers in data centers. Alternatively, server 104 and server 106 may each represent computing nodes in a cloud environment that hosts data content migration and delivery services.

Client 110, client 112, and client 114 also connect to network 102. Clients 110, 112, and 114 are clients of server 104 and/or server 106. In this example, clients 110, 112, and 114 are shown as cellular phones with wireless communication links to network 102. However, it should be noted that clients 110, 112, and 114 are examples only and may represent other types of mobile data processing systems, such as, for example, laptop computers, handheld computers, smart phones, smart watches, mobile gaming devices, personal digital assistants, and the like. Users of clients 110, 112, and 114 may utilize clients 110, 112, and 114 to access and utilize the data content migration and delivery services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different client device users, user profiles, data content, and the like. Furthermore, storage unit 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, a 5G telecommunications network, a radio access network, an optical fixed access network, an internet, an intranet, a local area network (LAN), a wide area network (WAN), a wireless fidelity (Wi-Fi) network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores data migration and delivery manager 218. However, it should be noted that even though data migration and delivery manager 218 is illustrated as residing in persistent storage 208, in an alternative illustrative embodiment data migration and delivery manager 218 may be a separate component of data processing system 200. For example, data migration and delivery manager 218 may be a hardware component coupled to communication fabric 202 or a combination of hardware and software components. In another alternative illustrative embodiment, a first set of components of data migration and delivery manager 218 may be located in data processing system 200 and a second set of components of data migration and delivery manager 218 may be located in a second data processing system, such as, for example, server 106 or client 110 in FIG. 1.

Data migration and delivery manager 218 controls the process of managing and facilitating access to data content in a distributed wireless communication network by users while traveling using a service orchestration layer of a 5G network. Data migration and delivery manager 218 includes machine learning component 220. Machine learning component 220 may be, for example, an artificial intelligence program or the like. Data migration and delivery manager 218 utilizes machine learning component 220 to detect, analyze, and learn user data access patterns and intelligently generate data content delivery plans for traveling users.

Data content 222 represents any type of data or information, such as, for example, streaming data, video content, audio content, alphanumeric content, still images, graphics, symbols, or any combination thereof. In addition, data content 222 may be, for example, business-related information, leisure-related information, special event information, historical information, cultural information, educational information, instructional information, entertainment information, or the like. Data migration and delivery manager 218 migrates or copies and migrates data content 222 from one or more storage devices, such as storage 108 in FIG. 1, to a set of one or more target destinations, such as, for example, a cellular tower or data center, which is closest to user 224 while traveling. Data migration and delivery manager 218 migrates data content 222 to the set of target locations in response to a request for data content 222 by user 224 or in response to machine learning component 220 predicting that user 224 would like to receive data content 222 based on learned insights, historical data, and real-time data. User 224 represents a unique identifier for the person who will receive or is receiving data content 222. Also, it should be noted that user 224 may represent a plurality of different users.

Profile 226 represents a user profile that corresponds to user 224. Data migration and delivery manager 218 may retrieve profile 226 from a storage device located on a data processing system, such as a computer or mobile device, associated with user 224. Alternatively, machine learning component 220 may generate profile 226 over time based on learned insights and store profile 226 on a storage device coupled to data processing system 200. Profile 226 includes, for example, identifiers for one or more mobile devices, such as a smart phone or watch, corresponding to user 224; data delivery preferences of user 224, such as what type of network (e.g., public WiFi network) to use to deliver data content 222 and under what circumstances (e.g., at an airport terminal when traveling by air to avoid roaming charges); data content access patterns of user 224; habits of user 224;

personality traits of user 224; identifiers and addresses for electronic data sources, such as electronic calendars and mailboxes, corresponding to user 224; and the like.

Real-time user voice input data 228 represent spoken input by user 224 that data migration and delivery manager 218 converts to text using a voice-to-text component. Data migration and delivery manager 218 receives real-time user voice input data 228 from, for example, a cognitive entity or virtual assistant, which is located on the mobile device that user 224 is currently using, that captured the voice input. Real-time user voice input data 228 provides, for example, an itinerary or schedule of events, such as user 224 will layover at location "X" for "Y" amount of time and then continue by plane to location "Z", arriving at the scheduled time.

Geolocation data 230 represent geographic location information corresponding to user 224. Geolocation data 230 may be, for example, geographic coordinates. Data migration and delivery manager 218 may receive geolocation data 230 from, for example, a GPS transceiver located on the mobile device currently being used by user 224. Alternatively, data migration and delivery manager 218 may determine geolocation data 230 using, for example, cellular tower triangulation or Evolved Node B (E-Node B) three-dimensional trilateration methods.

Other relevant information 232 represents additional information that machine learning component 220 may utilize to intelligently develop a delivery plan for data content 222. For example, other relevant information 232 may include facial expressions, gestures, and mood of user 224. The facial expressions, gestures, and mood of user 224 may be captured by the cognitive entity or virtual assistant located on the mobile device currently being used by user 224. Other relevant information 232 may also include, for example, local culture, environment, weather, and maps corresponding to the current geographic location or scheduled future geographic location of user 224. Data migration and delivery manager 218 may retrieve the local culture, environment, weather, and map information from one or more remote storage devices or databases.

Travel plan 234 represents a current plan of travel for user 224. Data migration and delivery manager 218 generates travel plan 234 based on, for example, electronic calendar entries, text messages, emails, social media posts, and the like, which correspond to user 224. In addition, data migration and delivery manager 218 may also utilize real-time user voice input data 228 to generate travel plan 234. Travel plan 234 includes, for example, type of travel, such as business or personal travel; mode of travel, such as air or vehicle travel; travel route; travel time schedule; scheduled stops along the travel route; and the like.

Data migration and delivery manager 218 generates intelligent data delivery plan 236 based on insights 238 derived from the information associated with data content 222, profile 226 of user 224, real-time user voice input data 228, geolocation data 230, other relevant information 232, and travel plan 234. Insights 238 represent understanding and knowledge gained by machine learning component 220 analyzing contents of the different information sources. Intelligent data delivery plan 236 is a plan for intelligently migrating and delivering data content 222 to user 224 while traveling. Intelligent data delivery plan 236 may include, for example, one or more intermediate data delivery target destinations for all or a portion of data content 222 to be delivered to user 224 at appropriate times. For example, travel plan 234 may indicate that user 224 is on vacation, traveling from Bangalore to Paris by train with several scheduled stops in between. The intermediate data delivery target destinations may be, for example, Wi-Fi network servers, cellular towers, E-Node B hardware, and/or data center servers, located in, adjacent to, or nearest to the train stations corresponding to each of the scheduled train stops. Data migration and delivery manager 218 migrates all or a portion of data content 222 to each respective intermediate data delivery target destination, just prior to or during each scheduled layover time interval, and autonomously delivers all or a portion of data content 222 to user 224 at each respective train stop.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Advancements in the telecommunication industry has enabled many technologies, such as Artificial Intelligence (AI), to succeed by breaking the barrier of various factors like sedentary operations, low bandwidth, and the like. 4G telecommunication technology pushed such technologies to an upper stratum by parallelizing the physical channel, thus providing higher bandwidth. 5G technology is expected to push dependent technologies to an even higher level through mobility bandwidth of one gigabit per second, convergence of device access, and the like. One feature of 5G is that the network, itself, is intelligent and cognitive. Thus, a 5G network is expected to become a part of the human community through various features including observing surroundings, reasoning, inferring, and making decisions like humans.

Currently, data delivered and stored by service providers is highly static and is highly dependent on the service providers' knowledge and understanding of user preference and geographic location. If a particular user who accesses data from a service provider's server is moving, then data served by the user's service provider's network moves slowly and takes an increased amount of time to reach the user with existing 4G networks. No mechanism currently exists by which data delivery can be automated considering user preference and location. Also, no mechanism currently exists by which a service orchestration layer of a 5G network can identify the media type, current user view, user location, and user preference and, accordingly, autonomously update data delivery using data that can be served quickly to the user.

Illustrative embodiments utilize an apparatus to observe and infer the state of users, such as their locations, travel plans, data usage patterns, and preferences, which will trigger a data delivery network to tune the requested data accordingly considering predicted user location and type of data format needed for the given user location and circumstances. Illustrative embodiments provide an apparatus working in the service orchestration layer of the 5G network, along with co-existing smart channel monitoring tools in 4G compatible platforms, that identifies insights and understanding into data delivered by network service providers and other data servers, such as media channels and private data providers. This is similar to a person who is a user of a telecommunications service provider and uses the telecommunication network for voice calls, but uses a different service provider, which only offers data services, for data. In this case, the user is on both networks (i.e., one network for voice and another network for data) using the same communication identity, such as a Subscriber Identity Module.

Illustrative embodiments intelligently determine a data access pattern of a user, convert the data access pattern to a data migration plan for processing, analyze delivered data content to identify insights and understanding into the delivered data content, detect data delivery requirements for the delivered data content, such as, for example, the user's frequency of accessing the data content, optimal time to deliver the data content when the user is traveling, habits of the user, geographic location of the user, time zone of that geographic location, local culture in that geographic location, environment of that geographic location, and the like, and autonomously deliver the data content to the user based on the identified insights. Illustrative embodiments may also utilize an electronic calendar and other electronic data sources, such as a stored user profile, corresponding to the user to determine type of travel, such as business travel or personal travel, user-preferred data delivery settings, and the like. Then, illustrative embodiments determine the data delivery requirements based on the type of travel, geographic location, and user-preferred data delivery settings and then migrate the data content closer to the user accordingly.

Illustrative embodiments may also detect the data delivery requirements by mapping the type of travel to other disclosed parameters, such as mode of travel (e.g., air, water, road, rail, public transport, private transport, and the like), stops along the planned path of travel (e.g., layovers, site seeing events, food breaks, restroom breaks, and the like) and considers these other parameters when migrating the data content closer to the user. For example, if a particular user is travelling for fun by train and the train has a scheduled stop at station "X" for 3 hours, then illustrative embodiments may determine that the user is most likely to watch a favorite movie during that 3-hour period based on historical user data (e.g., stored user profile, preferences, known habits, and the like). As a result, illustrative embodiments intelligently migrate the data content (i.e., favorite movie) to a target location, such as a particular cellular tower or a data center, closest to the geographic location of the user at the time of the 3-hour stop and update the content distribution network for the same when operated in network operations center mode. Further, illustrative embodiments may also consider mood of the user (e.g., happy, sad, angry, and the like) when determining what type of data content to deliver to the user. Furthermore, illustrative embodiments may receive inputs from the user for more accurate data content migration when the user is not available on any network, such as, for example, when the user is traveling by air and the user's mobile device is in airplane mode.

Illustrative embodiments work in the service orchestration layer of a 5G network and poll for data requests and associated content to be delivered to a user. Based on discovered insights, illustrative embodiments apply classifications on requested data to place the requested data content into subsets of the requested data and relative access types. By retrieving travel information from various sources (e.g., electronic calendar of the user), illustrative embodiments are able to determine the type of travel, such as personal travel or business travel, for the user. Illustrative embodiments also determine intermediate data delivery destinations for the requested data content by considering travel mode, schedule, stops, and other specified factors corresponding to the user.

Illustrative embodiments map an artificial intelligence program's information to local culture information, along with several other parameters, and activate triggers to a content distribution network and data storage services to migrate the requested data content closer to the geographic location of the user based on determined timetables when operated in network operations center mode. Once illustrative embodiments determine an intelligent data migration plan, illustrative embodiments push requested data content to selected servers via a data delivery network based on the ultimate travel destination of the user and any stops in between. Upon migration of the requested data content, illustrative embodiments update data routing indices for increased performance of routing requested data content to different geolocations in the future.

Illustrative embodiments utilize a data migration and delivery manager, which is a graphical user interface-based component, having a plurality of capabilities. For example, the data migration and delivery manager leverages a user's audio feed from real-time capture and converts the speech to text. The data migration and delivery manager sends the text to a hierarchical or parallel classifier, along with the in-scope boundary definition (e.g., travel plan). In addition, the data migration and delivery manager captures the geographic location of a 5G mobile device corresponding to the user by utilizing, for example, existing GPS techniques, determines activities performed by the user, and selects data content for delivery accordingly.

The data migration and delivery manager also integrates with the user's electronic calendar, electronic mailboxes, and other electronic data sources corresponding to the user to detect type of travel and maps data delivery requirements based on the detected type of travel. For example, if the data migration and delivery manager detects family travel for the user, then no data delivery requirement exists for the data migration and delivery manager to migrate business-related data content to the family travel destination.

Further, the data migration and delivery manager detects intermediate travel stops, travel speed, and travel mode and considers these factors while determining a data migration plan. For example, if the data migration and delivery manager detects that a particular user is traveling by air having an intermediate stop duration of 6 hours, then the data migration and delivery manager selects requested data content to be migrated to the intermediate stop location for more accurate and efficient data delivery during travel.

Furthermore, the data migration and delivery manager predicts the probability of a particular user accessing data content based on learned user data access patterns and schedules and autonomously migrates the data content via triggering a content delivery network for data migration. Moreover, the data migration and delivery manager retrieves local culture information, determines media effects based on metadata classification of the requested data content, and predicts timelines for delivery of the requested data content based on these factors. For example, the data migration and delivery manager may determine that a particular user is going to a funeral and does not want data delivery while at the funeral. However, the data migration and delivery manager may determine that it is highly probable that this same user may want data delivery when the user has an airport layover.

The data migration and delivery manager also assimilates weather information, user personality information, and user mood information and classifies requested data content based on these derived insights. For example, the data migration and delivery manager may determine that it is highly probable that this same user may want light-hearted or comedic data content delivered to the user when the user is stuck in an airport due to weather-related delays.

The data migration and delivery manager also analyzes captured user facial expressions, phrases spoken, and gestures made to shape the type of data content delivered and generate corresponding metadata. The data migration and delivery manager also receives inputs from the user and selects data and media server locations based on the user inputs. For example, the data migration and delivery manager cannot track the geographic location of a mobile device corresponding to the user if the device is powered off. In this case, the user may have previously input a voice message saying that at 0900 hours I will be at a New York airport and at 1700 hours I will be at a San Francisco airport. Consequently, the data migration and delivery manager migrates or replicates and moves the data content to a target location at, or near, the San Francisco airport at, or near, 1700 hours even though the location of the user's mobile device cannot be tracked in flight. Thus, the data migration and delivery manager migrates or copies and moves the data content based on the user-defined time intervals at user-defined geographic locations. Alternatively, the data migration and delivery manager may migrate or replicate and move the data content based on cognitive destination prediction with time and location.

Moreover, the data migration and delivery manager checks user-preferred settings of data delivery and data delivery networks on 5G and determines whether to migrate data to the nearest location or not based on the user-preferred settings. For example, a particular user prefers not to use data services while the user's mobile device is in roaming mode and prefers to use free Wi-Fi network locations, such as, for example, airport terminals. Then, the data migration and delivery manager leverages these user-preferred settings to cognitively learn to select an appropriate Wi-Fi network server at the airport to deliver the data content instead of using the user's service provider's servers.

With reference now to FIG. 3, a diagram illustrating an example of an artificial intelligence-based autonomous data migration and delivery system is depicted in accordance with an illustrative embodiment. Artificial intelligence-based autonomous data migration and delivery system 300 may be implemented in a network of data processing systems, such as network data processing system 100 in FIG. 1. Artificial intelligence-based autonomous data migration and delivery system 300 is a system of hardware and software components for intelligently managing and facilitating access to data content in a distributed wireless communication network by a user while traveling using a service orchestration layer of a 5G network.

In this example, artificial intelligence-based autonomous data migration and delivery system 300 includes server 302, user devices 304, E-Node B tower 306, data content library 308, remote data sources 310, content delivery network 312, and mobile user device 314. However, it should be noted that artificial intelligence-based autonomous data migration and delivery system 300 is intended as an example only and not as a limitation on different illustrative embodiments. In other words, artificial intelligence-based autonomous data migration and delivery system 300 may include more or fewer components than shown.

User devices 304 represent a plurality of data processing systems, such as, for example, a smart phone, desktop computer, personal digital assistant, and smart television, which correspond to user 305. Also, it should be noted that user devices 304 represent a plurality of different groups of data processing systems corresponding to a plurality of different users. User devices 304 are coupled to E-Node B tower 306, which in turn is coupled to server 302. It should be noted that E-Node B tower 306 represents a network of E-Node B towers. Artificial intelligence-based autonomous data migration and delivery system 300 utilizes E-Node B tower 306 to transfer data and information between user devices 304 and server 302.

Data content library 308 represents a plurality of different data content libraries containing a plurality of different types of data content or information for delivery to requesting users by server 302 using data migration and delivery manger 316. Server 302 may be, for example, server 104 in FIG. 1 or data processing system 200 in FIG. 2. Data migration and delivery manager 316 may be, for example, data migration and delivery manager 218 in FIG. 2.

Remote data sources 310 represent a plurality of different information sources, such as sources for user personality information, electronic calendar information, text message information, email information, social media information, weather information, travel information, map information, culture information, time zone information, and the like. Data migration and delivery manger 316 retrieves the different types of information from remote data sources 310 to assist in generating an intelligent data delivery plan, such as intelligent data delivery plan 236 in FIG. 2, for intelligently migrating and delivering data content from data content library 308 to user 305 while traveling via mobile user device 314. It should be noted that mobile user device 314 is one of user devices 304 corresponding to user 305. Also, it should be noted that data migration and delivery manager 316 utilizes content delivery network 312 to transmit the data content to mobile user device 314.

Further, it should be noted that data migration and delivery manager 316 includes a plurality of components. In this example, data migration and delivery manager 316 includes a speech-to-text component, a boundary extractor, a boundary map coordinate identifier, a map-based classifier, a location-based classifier, a content delivery search component, a travel type identifier, a travel-oriented data classifier, a media metadata map compare component, a notifier, an auto-delivery manager, and an incident cycle manager. However, it should be noted that data migration and delivery manager 316 may include more or fewer component than shown.

The speech-to-text component converts user voice inputs to text for analysis by data migration and delivery manager 316. The boundary extractor determines how much data content needs to be extracted for a particular geographic location based on events. The boundary map coordinate identifier identifies geographic coordinates of the traveling user for delivering the data content to one or more intermediate data delivery destinations, as well as a final travel destination. The map-based classifier classifies map information for delivery of the data content to a target destination. The location-based classifier classifies geographic location information corresponding to the traveling user. The content delivery search component predicts when the traveling user is close to or has arrived at the set of data delivery destinations. The travel type identifier identifies the type of travel, such as business travel, corresponding to the traveling user. The travel-oriented data classifier classifies traveling information corresponding to the traveling user for delivery of the data content. The media metadata map compare component reads metadata corresponding to the data content to determine restrictions associated with the data content, such as, for example, X-rated data content may not be delivered to certain geographic locations. The notifier notifies the traveling user regarding any issues. The auto-delivery manager autonomously delivers the data content to the traveling user. The incident cycle manager tracks and records any incidents or events corresponding to delivery of the data content to the traveling user.

Figure 4:
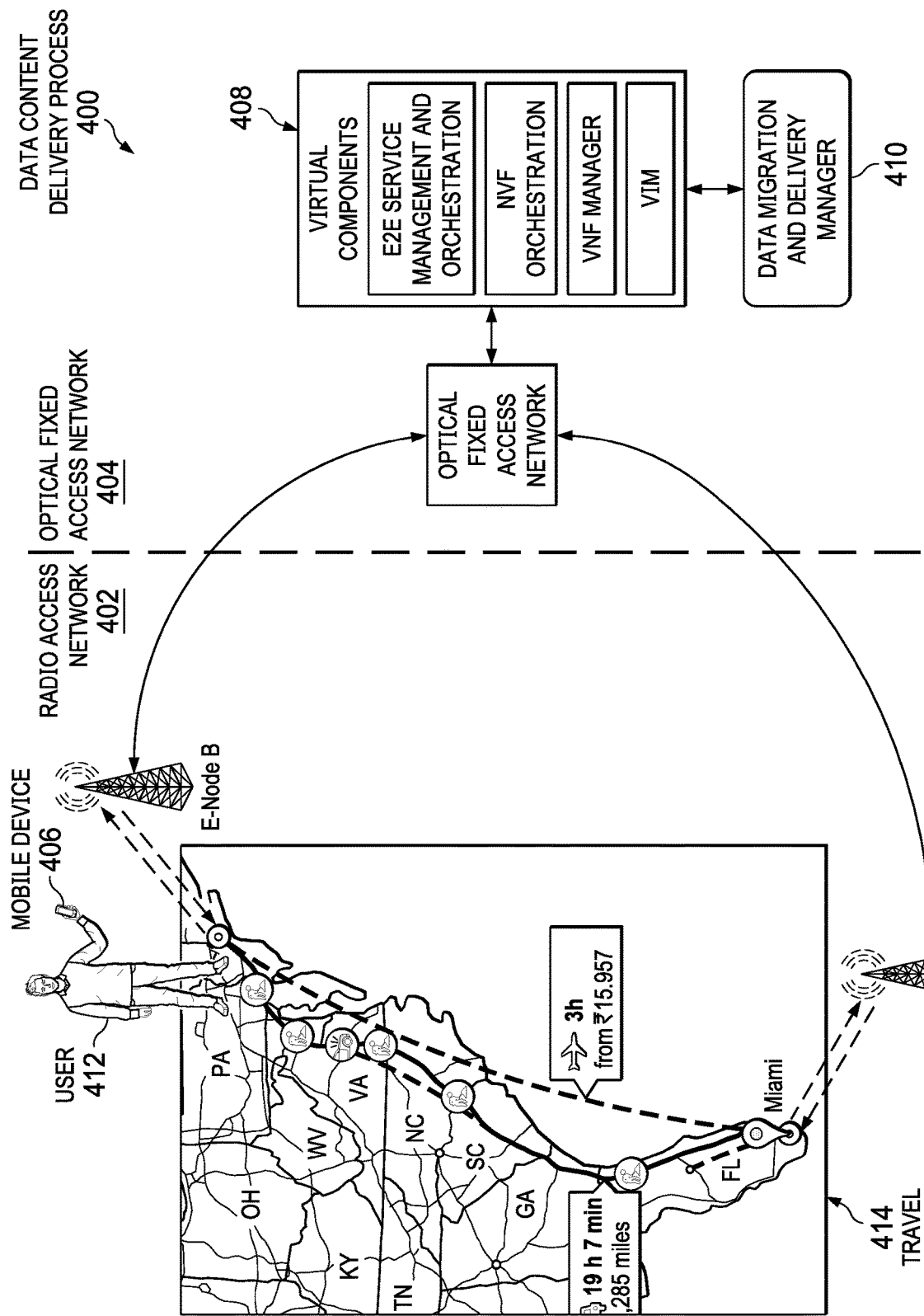
FIG. 4 is a diagram illustrating an example of a data content delivery process in accordance with an illustrative embodiment.

With reference now to FIG. 4, a diagram illustrating an example of a data content delivery process is depicted in accordance with an illustrative embodiment. Data content delivery process 400 may be implemented in a network of data processing systems, such as network data processing system 100 in FIG. 1 or artificial intelligence-based autonomous data migration and delivery system 300 in FIG. 3.

In this example, data content delivery process 400 includes radio access network 402, optical fixed access network 404, mobile device 406, virtual components 408, and data migration and delivery manager 410. Radio access network 402 and optical fixed access network 404 provide communication links between the different components (i.e., mobile device 406, virtual components 408, and data migration and delivery manager 410) using E-Node B towers in a 5G network.

In this example, virtual components 408 include end-to-end service management and orchestration, network functions virtualization orchestration, virtual network functions management, and virtual infrastructure management for coordinating resources and networks needed to provide the data content migration and delivery services provided by data migration and delivery manager 410. Data migration and delivery manager 410 may be, for example, data migration and delivery manager 218 in FIG. 2 or data migration and delivery manager 316 in FIG. 3.

In this example, data migration and delivery manager 410 detects business travel by user 412 from New York to Miami. It should be noted that mobile device 406 corresponds to user 412. In addition, data migration and delivery manager 410 detects that user 412 is traveling alone by air and has a scheduled 1-hour layover in Atlanta. Thus, data migration and delivery manager 410, utilizing the detected information corresponding to the business trip, generates travel plan 414. Further, data migration and delivery manager 410, utilizing derived information insights, predicts the type of data content, such as, for example, an on demand favorite television show, that user 412 may want to watch during the scheduled layover. Data migration and delivery manager 410 migrates the entertainment data to a target destination closest to the user in synchronization with the travel time and user's geographic location during the 1-hour layover according to an intelligent data delivery plan, such as intelligent data delivery plan 236 in FIG. 2.

Figure 5:
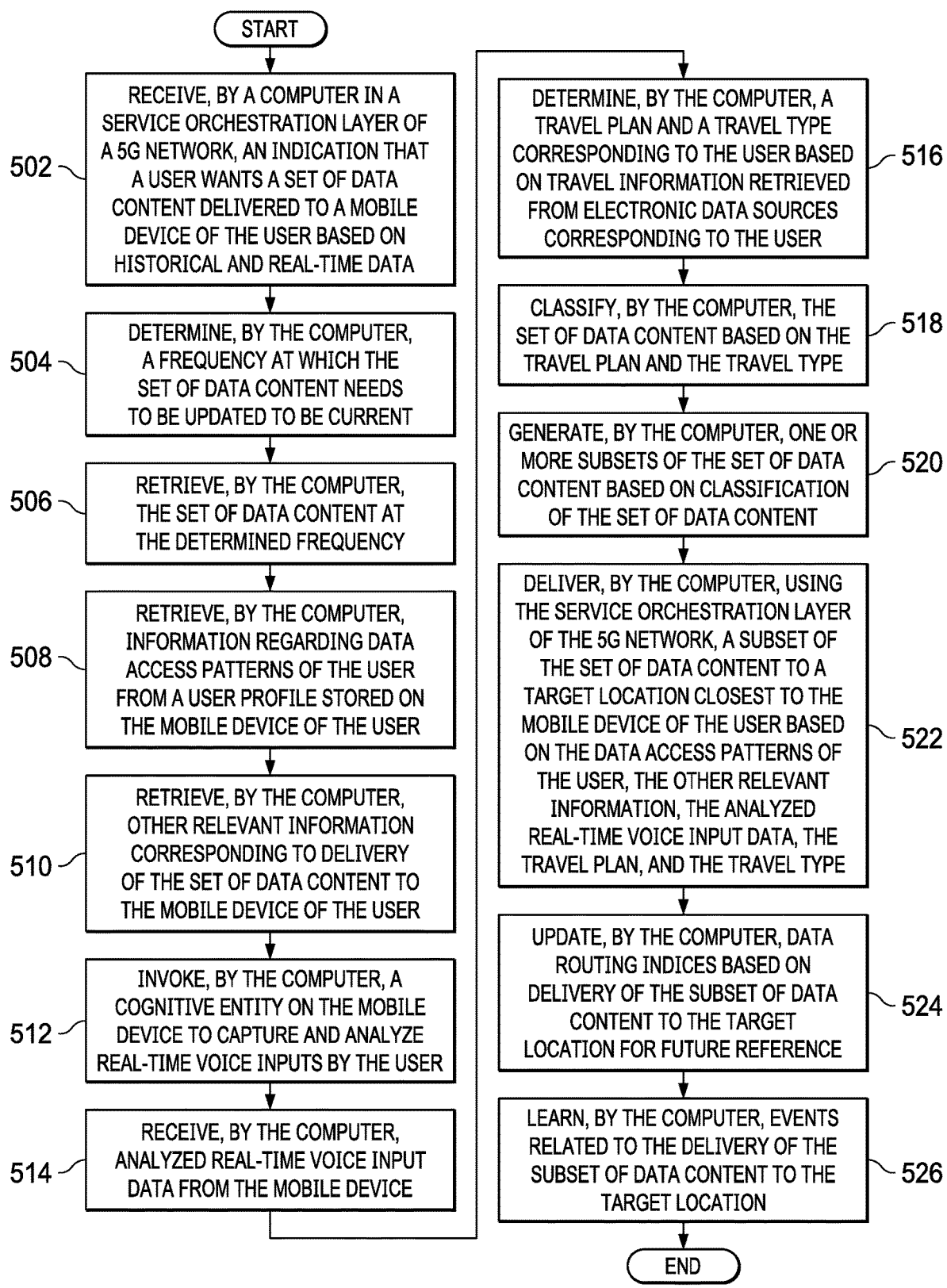
FIG. 5 is a flowchart illustrating a process for intelligent data content migration and delivery in accordance with an illustrative embodiment.

With reference now to FIG. 5, a flowchart illustrating a process for intelligent data content migration and delivery is shown in accordance with an illustrative embodiment. The process shown in FIG. 5 may be implemented in a computer in a service orchestration layer of a 5G telecommunications network, such as, for example, server 104 in FIG. 1. In addition, the process may be provided as-a-service in the 5G telecommunications network. Also, the computer collects user mobility information from lower level implementations of the 5G telecommunications network to perform data migration operations.

The process begins when the computer receives an indication that a user wants a set of data content delivered to a mobile device of the user based on historical and real-time data (step 502). The computer determines a frequency at which the set of data content needs to be updated to be current (step 504). The frequency may be, for example, every minute, hour, day, or any other increment of time. In addition, the computer retrieves the set of data content at the determined frequency (step 506).

Further, the computer retrieves information regarding data access patterns of the user (step 508). The computer may retrieve the information regarding data access patterns from a user profile stored on the mobile device of the user. Alternatively, the computer may retrieve the information regarding data access patterns from a user profile stored on a network storage device or stored on the computer, itself.

Furthermore, the computer retrieves other relevant information corresponding to delivery of the set of data content to the mobile device of the user (step 510). The other relevant information may include, for example, captured user facial expressions, user mood, user gestures, user phrases spoken, local culture information, local weather information, local time zone information, local environment information, and the like. The computer may retrieve the other relevant information from the mobile device and/or a plurality of remote data sources, such as remote data sources 310 in FIG. 3.

Moreover, the computer, invokes a cognitive entity on the mobile device to capture and analyze real-time voice inputs by the user (step 512). The computer receives analyzed real-time voice input data from the mobile device (step 514). The computer also determines a travel plan and a travel type corresponding to the user based on travel information retrieved from electronic data sources corresponding to the user (step 516). The type of travel may be, for example, business or personal travel. The electronic data sources may be, for example, an electronic calendar, an electronic mailbox, and the like. The electronic calendar may be stored on the mobile device or on a remote data source. The electronic mailbox may be, for example, an email inbox.

The computer classifies the set of data content based on the travel plan and the travel type (step 518). Afterward, the computer generates one or more subsets of the set of data content based on classification of the set of data content (step 520). The computer, using the service orchestration layer of the 5G network, delivers a subset of the set of data content to a target location closest to the mobile device of the user based on the data access patterns of the user, the other relevant information, the analyzed real-time voice input data, the travel plan, and the travel type (step 522). The target location closest to the mobile device may be, for example, a cellular tower or a data center.

The computer updates data routing indices based on delivery of the subset of data content to the target location for future reference (step 524). In addition, the computer learns events related to the delivery of the subset of data content to the target location (step 526). Thereafter, the process terminates.

Figure 6:
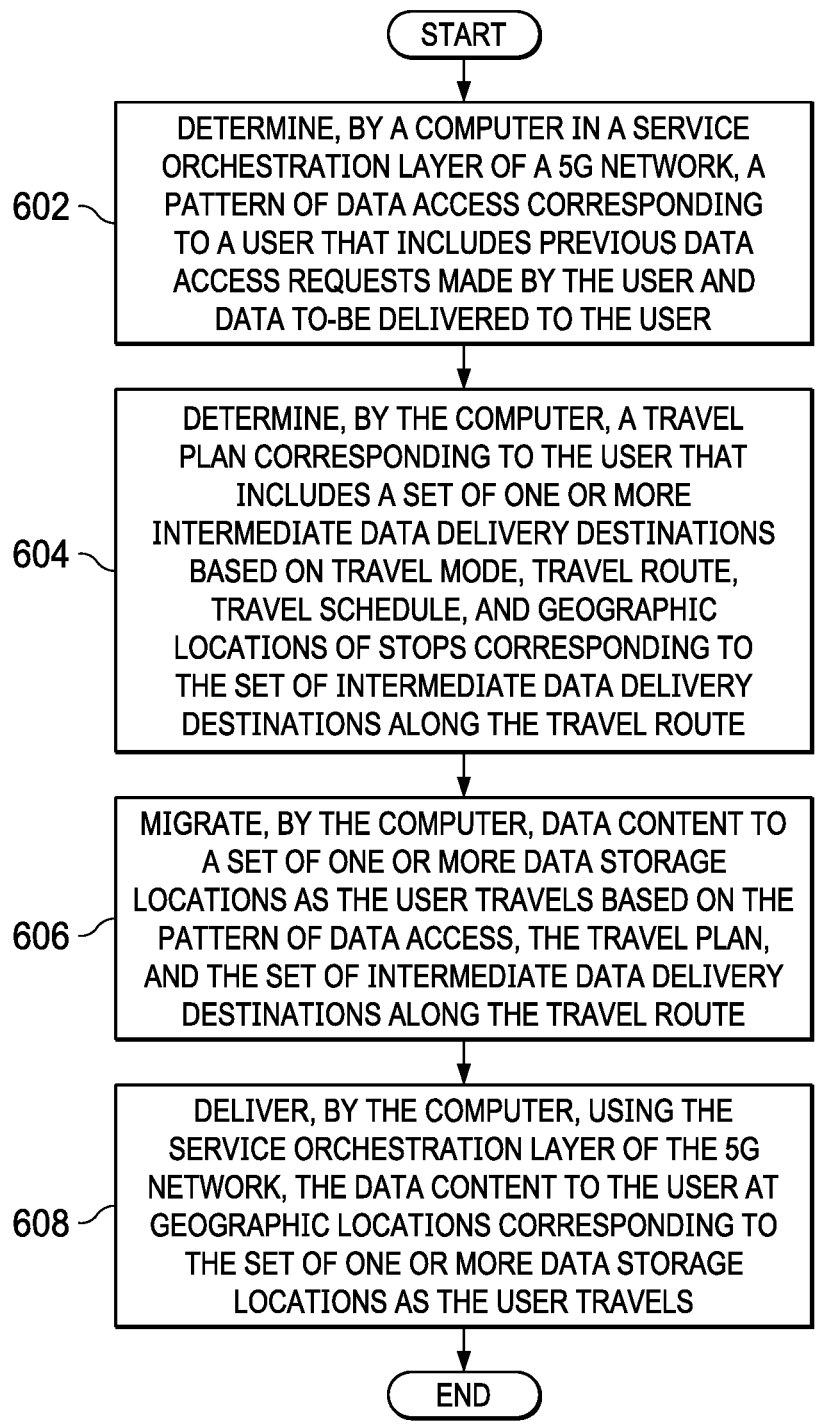
FIG. 6 is a flowchart illustrating a process for delivering data content to a user in accordance with an illustrative embodiment.

With reference now to FIG. 6, a flowchart illustrating a process for delivering data content to a user is shown in accordance with an illustrative embodiment.

The process shown in FIG. 6 may be implemented in a computer in a service orchestration layer of a 5G telecommunications network, such as, for example, server 104 in FIG. 1. In addition, the process may be provided as-a-service in the 5G telecommunications network. Also, the computer collects user mobility information from lower level implementations of the 5G telecommunications network to perform data migration operations.

The process begins when the computer determines a pattern of data access corresponding to a user that includes previous data access requests made by the user and data to-be delivered to the user (step 602). The computer also determines a travel plan corresponding to the user that includes a set of one or more intermediate data delivery destinations based on travel mode, travel route, travel schedule, and geographic locations of stops corresponding to the set of intermediate data delivery destinations along the travel route (step 604).

The computer migrates data content to a set of one or more data storage locations as the user travels based on the pattern of data access, the travel plan, and the set of intermediate data delivery destinations along the travel route (step 606). Then, the computer, using the service orchestration layer of the 5G network, delivers the data content to the user at geographic locations corresponding to the set of one or more data storage locations as the user travels (step 608). Thereafter, the process terminates.

Figure 7:
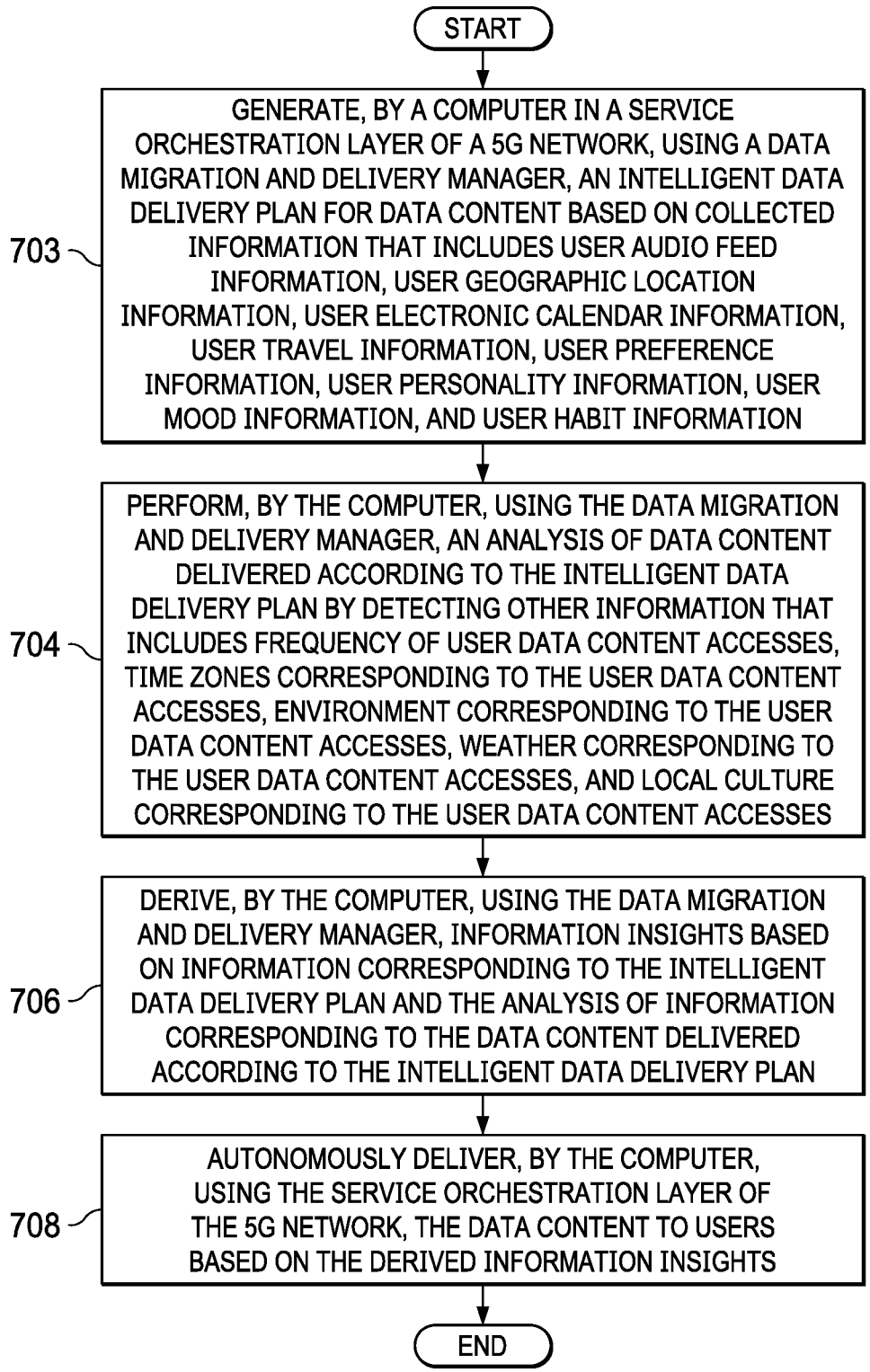
FIG. 7 is a flowchart illustrating a process for autonomously delivering data content to users in accordance with an illustrative embodiment.

With reference now to FIG. 7, a flowchart illustrating a process for autonomously delivering data content to users is shown in accordance with an illustrative embodiment. The process shown in FIG. 7 may be implemented in a computer in a service orchestration layer of a 5G telecommunications network, such as, for example, server 104 in FIG. 1. In addition, the process may be provided as-a-service in the 5G telecommunications network. Also, the computer collects user mobility information from lower level implementations of the 5G telecommunications network to perform data migration operations.

The process begins when the computer, using a data migration and delivery manager, generates an intelligent data delivery plan for data content based on collected information that includes user audio feed information, user geographic location information, user electronic calendar information, user travel information, user preference information, user personality information, user mood information, and user habit information (step 702). The data migration and delivery manager may be, for example, data migration and delivery manager 218 in FIG. 2, data migration and delivery manager 316 in FIG. 3, and data migration and delivery manager 410 in FIG. 4. The computer, using the data migration and delivery manager, performs an analysis of data content delivered according to the intelligent data delivery plan by detecting other information that includes frequency of user data content accesses, time zones corresponding to the user data content accesses, environment corresponding to the user data content accesses, weather corresponding to the user data content accesses, and local culture corresponding to the user data content accesses (step 704).

The computer, using the data migration and delivery manager, derives information insights based on information corresponding to the intelligent data delivery plan and the analysis of information corresponding to the data content delivered according to the intelligent data delivery plan (step 706). The computer, using the service orchestration layer of the 5G network, autonomously delivers the data content to users based on the derived information insights (step 708). Thereafter, the process terminates.

Thus, illustrative embodiments of the present invention provide a computer-implemented method, computer system, and computer program product for managing and facilitating access to data content in a distributed wireless communication network by a user while traveling using an artificial intelligence-based data migration and delivery apparatus in a service orchestration layer of a 5G network. Illustrative embodiments provide an ability to setup, manage, and detect user information via data usage pattern analysis, perform variable levels of user data usage monitoring based on time, surrounding circumstances, geographic location, type of travel, mode of travel, and data delivery requirements, and autonomously migrate requested data content to a nearest target location, such as a cellular tower or data center, to the user to fulfill data delivery requirements based on the service orchestration layer of the 5G network for data and media.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for migrating and delivering data content to a traveling user, the computer-implemented method comprising:

determining, by a computer, a pattern of data access corresponding to a user, the pattern of data access including previous data access requests made by the user and data to-be delivered to the user;

determining, by the computer, a travel plan corresponding to the user, the travel plan including a set of one or more intermediate data delivery destinations based on travel mode, travel route, travel schedule, and geographic locations of stops corresponding to the set of intermediate data delivery destinations along the travel route;

migrating, by the computer, the data content to a set of one or more data storage locations as the user travels based on the pattern of data access, the travel plan, and the set of intermediate data delivery destinations along the travel route;

delivering, by the computer, the data content to the user at geographic locations corresponding to the set of one or more data storage locations as the user travels;

generating, by the computer, an intelligent data delivery plan for the data content based on collected information that includes user audio feed information, user geographic location information, user electronic calendar information, user travel information, user preference information, user personality information, user mood information, and user habit information; and performing, by the computer, an analysis of the data content delivered according to the intelligent data delivery plan by detecting other information that includes frequency of user data content accesses, time zones corresponding to the user data content accesses, environment corresponding to the user data content accesses, weather corresponding to the user data content accesses, and local culture corresponding to the user data content accesses.

2. The computer-implemented method of claim 1 further comprising:

receiving, by the computer, an indication that the user wants the data content delivered to a mobile device of the user based on historical and real-time data;

determining, by the computer, a frequency at which the data content needs to be updated to be current; and retrieving, by the computer, the data content at the determined frequency.

3. The computer-implemented method of claim 1 further comprising:

retrieving, by the computer, information regarding data access patterns of the user; and retrieving, by the computer, other relevant information corresponding to delivery of the data content to a mobile device of the user.

4. The computer-implemented method of claim 1 further comprising:

invoking, by the computer, a cognitive entity on a mobile device of the user to capture and analyze real-time voice inputs by the user; and receiving, by the computer, analyzed real-time voice input data from the mobile device.

5. The computer-implemented method of claim 1 further comprising:

determining, by the computer, the travel plan and a travel type corresponding to the user based on travel information retrieved from electronic data sources corresponding to the user; and classifying, by the computer, the data content based on the travel plan and the travel type.

6. The computer-implemented method of claim 1 further comprising:

generating, by the computer, subsets of the data content based on classification of the data content; and delivering, by the computer, a subset of the data content to a target location closest to a mobile device of the user based on the pattern of data access, other relevant information, analyzed real-time voice input data, the travel plan, and travel type.

7. The computer-implemented method of claim 1 further comprising:

updating, by the computer, data routing indices based on delivery of the data content to the geographic locations corresponding to the set of one or more data storage locations as the user travels; and learning, by the computer, events related to the delivery of the data content to the geographic locations corresponding to the set of one or more data storage locations as the user travels.

8. The computer-implemented method of claim 1 further comprising:

deriving, by the computer, information insights based on information corresponding to the intelligent data delivery plan and analysis of information corresponding to the data content delivered according to the intelligent data delivery plan; and autonomously delivering, by the computer, the data content to users based on the derived information insights.

9. The computer-implemented method of claim 1, wherein the computer is located in a service orchestration layer of a fifth-generation (5G) telecommunications network, and wherein the computer-implemented method is provided as-a-service in the 5G telecommunications network; and wherein the computer collects user mobility information from lower level implementations of the 5G telecommunications network to perform data migration operations.

10. A computer system for migrating and delivering data content to a traveling user, the computer system comprising:

a bus system;

a storage device connected to the bus system, wherein the storage device stores program instructions; and a processor connected to the bus system, wherein the processor executes the program instructions to:

determine a pattern of data access corresponding to a user, the pattern of data access including previous data access requests made by the user and data to-be delivered to the user;

determine a travel plan corresponding to the user, the travel plan including a set of one or more intermediate data delivery destinations based on travel mode, travel route, travel schedule, and geographic locations of stops corresponding to the set of intermediate data delivery destinations along the travel route;

migrate the data content to a set of one or more data storage locations as the user travels based on the pattern of data access, the travel plan, and the set of intermediate data delivery destinations along the travel route;

deliver the data content to the user at geographic locations corresponding to the set of one or more data storage locations as the user travels;

generate an intelligent data delivery plan for the data content based on collected information that includes user audio feed information, user geographic location information, user electronic calendar information, user travel information, user preference information, user personality information, user mood information, and user habit information; and perform an analysis of the data content delivered according to the intelligent data delivery plan by detecting other information that includes frequency of user data content accesses, time zones corresponding to the user data content accesses, environment corresponding to the user data content accesses, weather corresponding to the user data content accesses, and local culture corresponding to the user data content accesses.

11. A computer program product for migrating and delivering data content to a traveling user, the computer program product comprising a computer readable storage medium having program instructions embodied therewith, the program instructions executable by a computer to cause the computer to perform a method comprising:

determining, by the computer, a pattern of data access corresponding to a user, the pattern of data access including previous data access requests made by the user and data to-be delivered to the user;

determining, by the computer, a travel plan corresponding to the user, the travel plan including a set of one or more intermediate data delivery destinations based on travel mode, travel route, travel schedule, and geographic locations of stops corresponding to the set of intermediate data delivery destinations along the travel route;

migrating, by the computer, the data content to a set of one or more data storage locations as the user travels based on the pattern of data access, the travel plan, and the set of intermediate data delivery destinations along the travel route;

delivering, by the computer, the data content to the user at geographic locations corresponding to the set of one or more data storage locations as the user travels;

generating, by the computer, an intelligent data delivery plan for the data content based on collected information that includes user audio feed information, user geographic location information, user electronic calendar information, user travel information, user preference information, user personality information, user mood information, and user habit information; and performing, by the computer, an analysis of the data content delivered according to the intelligent data delivery plan by detecting other information that includes frequency of user data content accesses, time zones corresponding to the user data content accesses, environment corresponding to the user data content accesses, weather corresponding to the user data content accesses, and local culture corresponding to the user data content accesses.

12. The computer program product of claim 11 further comprising:

receiving, by the computer, an indication that the user wants the data content delivered to a mobile device of the user based on historical and real-time data;

determining, by the computer, a frequency at which the data content needs to be updated to be current; and retrieving, by the computer, the data content at the determined frequency.

13. The computer program product of claim 11 further comprising:

retrieving, by the computer, information regarding data access patterns of the user; and retrieving, by the computer, other relevant information corresponding to delivery of the data content to a mobile device of the user.

14. The computer program product of claim 11 further comprising:
  invoking, by the computer, a cognitive entity on a mobile device of the user to capture and analyze real-time voice inputs by the user; and
  receiving, by the computer, analyzed real-time voice input data from the mobile device.

15. The computer program product of claim 11 further comprising:
  determining, by the computer, the travel plan and a travel type corresponding to the user based on travel information retrieved from electronic data sources corresponding to the user; and
  classifying, by the computer, the data content based on the travel plan and the travel type.

16. The computer program product of claim 11 further comprising:
  generating, by the computer, subsets of the data content based on classification of the data content; and
  delivering, by the computer, a subset of the data content to a target location closest to a mobile device of the user based on the pattern of data access, other relevant information, analyzed real-time voice input data, the travel plan, and travel type.

17. The computer program product of claim 11 further comprising:
  updating, by the computer, data routing indices based on delivery of the data content to the geographic locations corresponding to the set of one or more data storage locations as the user travels; and
  learning, by the computer, events related to the delivery of the data content to the geographic locations corresponding to the set of one or more data storage locations as the user travels.

18. The computer program product of claim 11 further comprising:
  deriving, by the computer, information insights based on information corresponding to the intelligent data delivery plan and analysis of information corresponding to the data content delivered according to the intelligent data delivery plan; and
  autonomously delivering, by the computer, the data content to users based on the derived information insights.

* * * * *